US006747968B1

(12) United States Patent
Seppälä et al.

(10) Patent No.: US 6,747,968 B1
(45) Date of Patent: Jun. 8, 2004

(54) METHODS AND SYSTEMS FOR WEIGHTED PCF POLLING LISTS FOR WLAN QOS SUPPORT

(75) Inventors: Jukka Seppälä, Pirkkala (FI); Juha Ala-Laurila, Tampere (FI); Jukka Immonen, Burlington, MA (US)

(73) Assignee: Nokia IP Inc., Mountain View, CA (US)

( * ) Notice: Subject to any disclaimer, the term of this patent is extended or adjusted under 35 U.S.C. 154(b) by 0 days.

(21) Appl. No.: 09/482,857

(22) Filed: Jan. 14, 2000

(51) Int. Cl.$^7$ ................................................ H04Q 7/24
(52) U.S. Cl. .................. 370/338; 370/346; 370/395.21; 370/449
(58) Field of Search ................................ 370/230, 235, 370/254, 338, 346, 352, 353, 359, 360, 386, 396, 398, 395.21, 395.3, 395.52, 412, 420, 429, 449, 466, 902

(56) References Cited

U.S. PATENT DOCUMENTS 5,852,773 A * 12/1998 Hu .............................. 455/403
6,298,053 B1 * 10/2001 Flammer et al. ............ 370/349

OTHER PUBLICATIONS

Suzuki et al., Performance evaluation of integrated video and data transmission with the IEEE 802.11 standard MAC protocol, Global Telecommunications Conference, 1999, pp.: 580–586, vol.: 1B, 1999.*
Ganz et al., Robust superpoll protocol for IEEE 802.11 wireless LANs, Oct. 18–21, 1998, Military Communications Conference, 1998. MILCOM 98. Proceedings., IEEE, pp.: 570–574 vol. 2.*
Ranasinghe et al., Distributed contention–free traffic scheduling in IEEE 802.11 multimedia networks, Local and Metropolitan Area Networks, 1999. 10th IEEE Workshop on Nov. 21–24, 1999. pp.: 18–28.*
Ranasinghe et al.,Impact of polling strategy on capacity of 802.11 based wireless multimedia LANs, Networks (ICON '99) Proceedings,IEEE International Conference on 1999, pp.: 96–103.*
Crow et al., IEEE 802.11 Wireless Local Area Networks, IEEE Communications Magazine, Sep. 1997, pp. 116–126.
Ranasinghe et al., Impact of Polling Strategy on Capacity of 802.11 Based Wireless Multimedia LANs, Department of Electrical and Electronic Engineering, The University of Melbourne, Parkville, VIC 3052, Australia, 1999 IEEE, pp. 96–103.
Mollenauer et al., Polling–based PCF for Strong QoS Guarantees, doc:IEEE 802.11–00/061, May 2000, slide 1–22.
IEEE 802.11 QoS MAC Enhancements Joint Proposal AT&T, Lucent, ShareWave, doc:IEEE 802.11–00/071, May 2000, slide 1–50.

* cited by examiner

*Primary Examiner*—Dang Ton
*Assistant Examiner*—Inder Pal Mehra
(74) *Attorney, Agent, or Firm*—Antonelli, Terry, Stout & Kraus, LLP

(57) ABSTRACT

Methods and system for weighted polling of terminals in a Wireless Local Area Network (WLAN). Quality of Service (QoS) information related to WLAN terminals is obtained. A weighted polling factor may be assigned to each WLAN terminal based on the QoS information. Each WLAN terminal may be polled during a transmission period based on the weighted polling factor assigned to each WLAN terminal.

19 Claims, 4 Drawing Sheets

FIG. 4

| WEIGHTED POLLING-LIST |
|---|
| MT1 |
| MT2 |
| MT3 |
| MT3 |
| MT3 |
| MT4 |
| MT5 |
| MT6 |

METHODS AND SYSTEMS FOR WEIGHTED PCF POLLING LISTS FOR WLAN QOS SUPPORT

BACKGROUND OF THE INVENTION

1. Field of the Invention

This invention relates to wireless local network (WLANs) and more specifically to weighted Point Coordination Function (PCF) polling lists for WLAN Quality of Service (QoS) support.

2. Background and Material Information

The Institute for Electrical and Electronic Engineers (IEEE) has developed a standard that defines a protocol for transferring data frames between wireless local area network stations and terminals. This is the IEEE Std. 802.11, IEEE standard for Wireless LAN Medium Access (MAC) and Physical Layer (PHY), 1997, which is herein incorporated by reference in its entirety. The standard defines a MAC layer with two different methods for accessing the wireless interface, the Distributed Coordination Function (DCF) and the Point Coordination Function (PCF). DCF is generally meant for Best Effort traffic delivery, and PCF is generally meant for Real Time traffic delivery. Best Effort traffic is a QoS class of traffic with no specific parameters and with no assurances that the traffic will be delivered across the network to the target device. Real Time traffic refers to traffic conducted in real time, i.e., there is no perceived delay in the transmission of the information or the response to it (e.g., interactive video). The DCF and the PCF are coexisting and the PCF requires that the DCF is implemented. The 802.11 MAC architecture provides the PCF through the services of the DCF.

In DCF, all terminals contend for who may send transmissions next. The fundamental access method of the 802.11 MAC is a DCF known as carrier sense multiple access with collision avoidance (CSMA/CA), which is an adaptation of carrier sense multiple access with collision detection (CSMA/CD) used by Ethernet networks. In a CSMA protocol, a station or terminal that wants to transmit on the wireless local area network WLAN medium, senses the medium to determine if the another station is transmitting (i.e., medium is busy). If not, the transmission may proceed. If the medium is busy, the station defers its transmission till the end of the current transmission and an idle period of time thereafter. The transmitting station may then exchange short control frames (request to send (RTS) and clear to send (CTS) frames) with a receiving station after determining that the medium is idle and prior to data transmission. The control frames message duration is known as the network allocation vector (NAV) and effectively alerts all other stations in the medium to back off for the duration of the data transmission.

In PCF, a point coordinator (PC) is used to coordinate transmissions of the terminals. The point coordinator acts as a polling master and polls all the PCF pollable terminals to determine which terminals may transmit. The PC may be located in an Access Point (AP) that provides wireless mobile terminals (MTs) access to the WLAN. In PCF, a terminal may be a pollable terminal (terminal desiring to be polled) or a non-pollable terminal (terminal not polled by the PC). A terminal that is polled may then transmit only one MAC Protocol Data Unit (MSDU). The terminal must be polled again to transmit for another time. If a particular transmission ends unsuccessfully, the terminal may not retransmit the data until polled again by the PC. Therefore, PCF provides a contention free mechanism for determining which terminal has the right to transmit.

At 802.11 WLAN is based on a cellular architecture where the system is subdivided into cells. Each cell is called a Basic Service Set (BSS), and is controlled by a base station called an Access Point (AP). The DCF and the PCF coexist and operate concurrently within a BSS. DCF may be used for Best Effort traffic delivery and PCF may be used for Real Time traffic delivery.

FIG. 1 shows a timing diagram of the PCF/DCF periods. When a PC is operating in a BSS, the two access methods (DCF and PCF) alternate, with a contention-free period (CFP) 2 followed by a contention period (CP) 4. CFPs and CPs alternate. These periods may be dynamically adjusted on the basis of the amount of polled terminals. Each terminal that has indicated the willingness to be polled, is polled once per CFP. A network allocation vector (NAV) 8 extends the message duration and alerts others in the medium to back off on attempting to gain access to the medium for the duration of the transmission.

Therefore, the IEEE Std. 802.11 defines a PCF basic operation capable of promising non-contested access to the air interface, thus ensuring that long contention times are not possible. However, the standard does not offer any mechanisms for promising more air interface than once per polling period for a particular terminal. Further, current methods do not provide a mechanism for preserving network level Quality Of Service (QoS) in the air interface based on upper layer QoS information.

SUMMARY OF THE INVENTION

Accordingly, the present invention is directed to methods and apparatus for weighted Point Coordination Function (PCF) polling lists for WLAN Quality of Service (QoS) support that substantially obviates one or more of the problems arising from the limitations and disadvantages of the related art.

In one aspect, the present invention is directed to a method for weighted polling of terminals in a Wireless Local Area Network (WLAN) that may include: obtaining information related to WLAN terminals; assigning a weighted polling factor to each WLAN terminal based on the information; and polling each WLAN terminal during a transmission period based on the weighted polling factor assigned to each WLAN terminal.

The information may be Quality of Service (QoS) related information. The QoS related information may include billing information, an amount of real time traffic destined from or to at least one WLAN terminal, a user profile of at least one WLAN terminal, and/or an amount of bandwidth consumed by at least one WLAN terminal. Each weighted polling factor may denote a number of times each WLAN terminal is to be polled. Each WLAN terminal may be polled by a Point Coordinator. The Point Coordinator may reside in an Access Point that may provide wireless WLAN terminals access to the WLAN.

The WLAN terminal may be pollable. The transmission period may be an IEEE 802.11 Contention Free Period (CFP). The WLAN terminal may be a mobile terminal. At least one WLAN terminal may be polled at least once during the transmission period. At least one WLAN terminal may be polled at least once during every other transmission period.

In another aspect, the present invention may be directed to a method for transferring data based on weighted polling of terminals in a Wireless Local Area Network (WLAN) that may include: dividing data to be transferred into best effort data and real time data; storing the best effort data in a best effort queue; storing the real time data in a real time queue; obtaining information related to at least one WLAN terminal associated with some real time data; assigning a weighted polling factor to each at least one WLAN terminal based on the information; placing a terminal identification of each at least one WLAN terminal in a polling list at least once based on the weighted polling factor of each at least one WLAN terminal; and polling WLAN terminals whose terminal identification is in the polling list based on a number of times each WLAN terminal identification is listed in the polling list. Each polled WLAN terminal may transfer the associated real time data during a transmission period.

The information may be Quality of Service (QoS) related information. The QoS related information may include billing information, an amount of real time traffic destined from or to at least one WLAN terminal, a user profile of at least one WLAN terminal, and an amount of bandwidth consumed by at least one WLAN terminal. Each weighted polling factor may denote a number of times each WLAN terminal is to be polled. The transmission period may be an IEEE 802.11 Contention Free Period (CFP). The WLAN terminal may be a mobile terminal.

In a further aspect, the present invention may be directed to a Wireless Local Area Network (WLAN) Quality of Service (QoS) system that provides weighted polling of WLAN terminals that includes: a WLAN; at least one access point operatively connected to the WLAN, and at least one WLAN terminal. The access point may include: a real time data queue; a best effort data queue; a data packet classifier where the data packet classifier separates data into real time data and best effort data; a data transfer manager where the data transfer manager stores the real time data in the real time data queue and the best effort data in the best effort data queue; and a polling list. The at least one WLAN terminal may be operatively connected to the at least one access point. The data transfer manager may obtain QoS related information related to the at least one WLAN terminal and assign a weighted polling factor to each at least one WLAN terminal based on the QoS related information. The data transfer manager may place a terminal identification of each at least one WLAN terminal related to some real data in the polling list queue at least once based on the weighted polling factor of each at least one WLAN terminal. The data transfer manager may poll WLAN terminals whose terminal identification is in the polling list queue based on a number of times each WLAN terminal identification is listed in the polling list. Each polled WLAN terminal may transfer the associated real time data during a transmission period.

The transmission period may be an IEEE 802.11 Contention Free Period (CFP). The WLAN terminal may be a mobile terminal. The QoS related information may include billing information, an amount of real time traffic destined from or to at least one WLAN terminal, a user profile of at least one WLAN terminal, and/or an amount of bandwidth consumed by at least one WLAN terminal.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows in reference to the noted plurality of drawings by way of non-limiting examples of preferred embodiments of the present invention in which like reference numerals represent similar parts throughout the several views of the drawings and wherein:

FIG. 4 is a block diagram of an example weighted polling list according to the present invention.

DETAILED DESCRIPTION OF THE PREFERRED EMBODIMENTS

The particulars shown herein are by way of example and for purposes of illustrative discussion of the embodiments of the present invention. The description taken with the drawings make it apparent to those skilled in the art how the several forms of the present invention may be embodied in practice.

The present invention relates to methods and systems for a management between a polling list and a QoS manager. The QoS manager may determine a weighting factor for each WLAN terminal on the basis of various information. This information may include, for example, how much bandwidth the terminal consumes, terminal user profile information, the status of the wireless link to the network, and/or QoS related information. The weighting factor may be used to determine how many times a particular terminal may be polled during a CFP. Performing multiple polling per terminal per CFP is advantageous since, for example, the terminal may have multiple active real-time connections and/or the voice/video delay may otherwise become unacceptable. Therefore, in methods and systems according to the present invention, desired or requested QoS may be achieved, and Real Time traffic services may be supported fairly.

QoS is a subjective measure of the service quality provided to a subscriber or user by the system. Multimedia streams, in contrast to traditional data traffic, may impose QoS demands on the networks that carry them due to possible bandwidth and delay sensitivities of the multimedia streams. Wireless Best Effort traffic delivery over Internet Protocol (IP) does not guarantee delivery of packets in order, in a timely manner, or at all. QoS relates to providing some guarantees for bandwidth, latency, jitter requirements, etc. for Real Time traffic over IP networks that insure an acceptable level of quality in a fashion that allows multimedia traffic to coexist with traditional data traffic on the same network.

Figure 1:
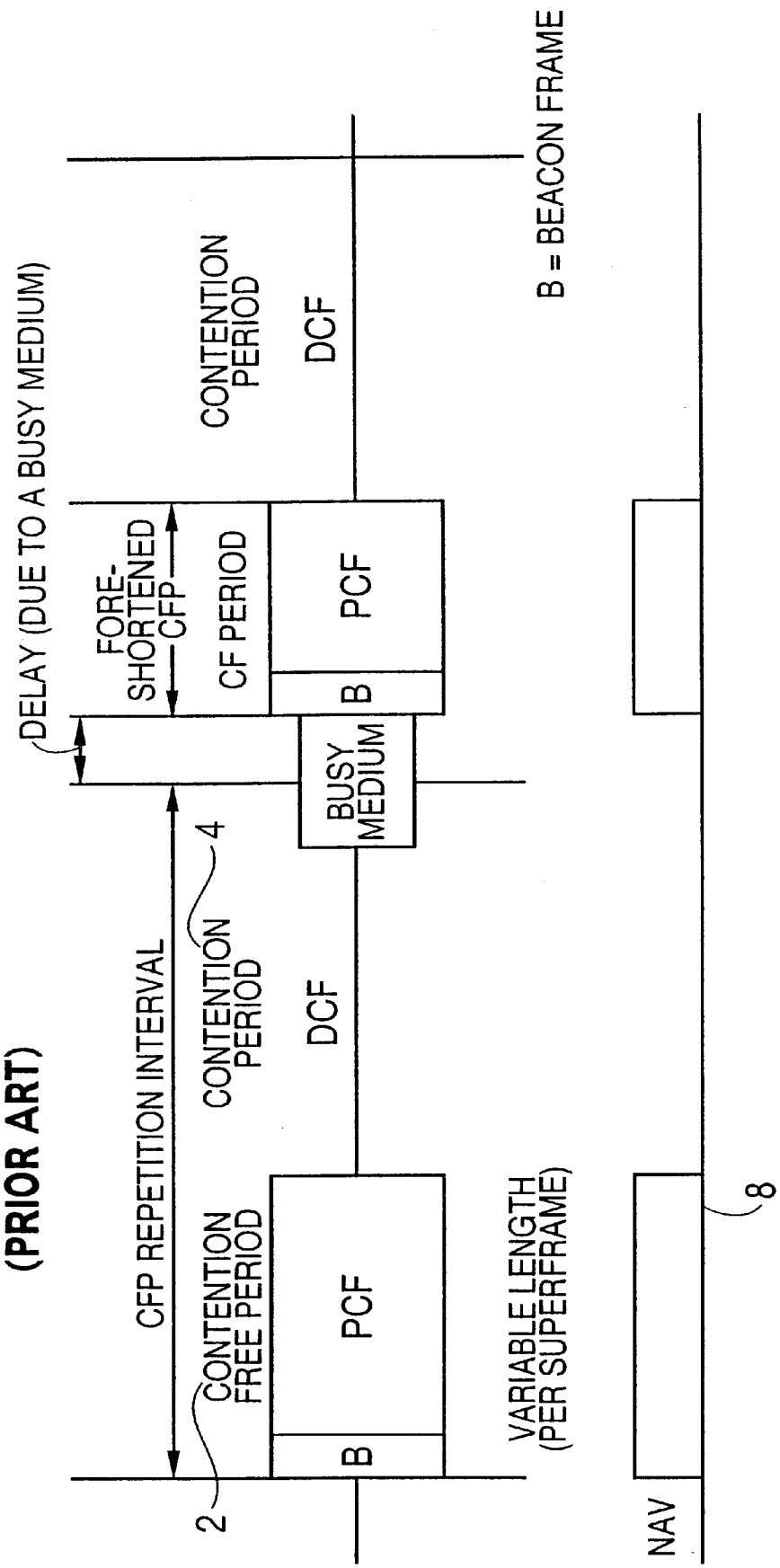
FIG. 1 is a timing diagram of exemplary PCF/DCF periods.
Figure 2:
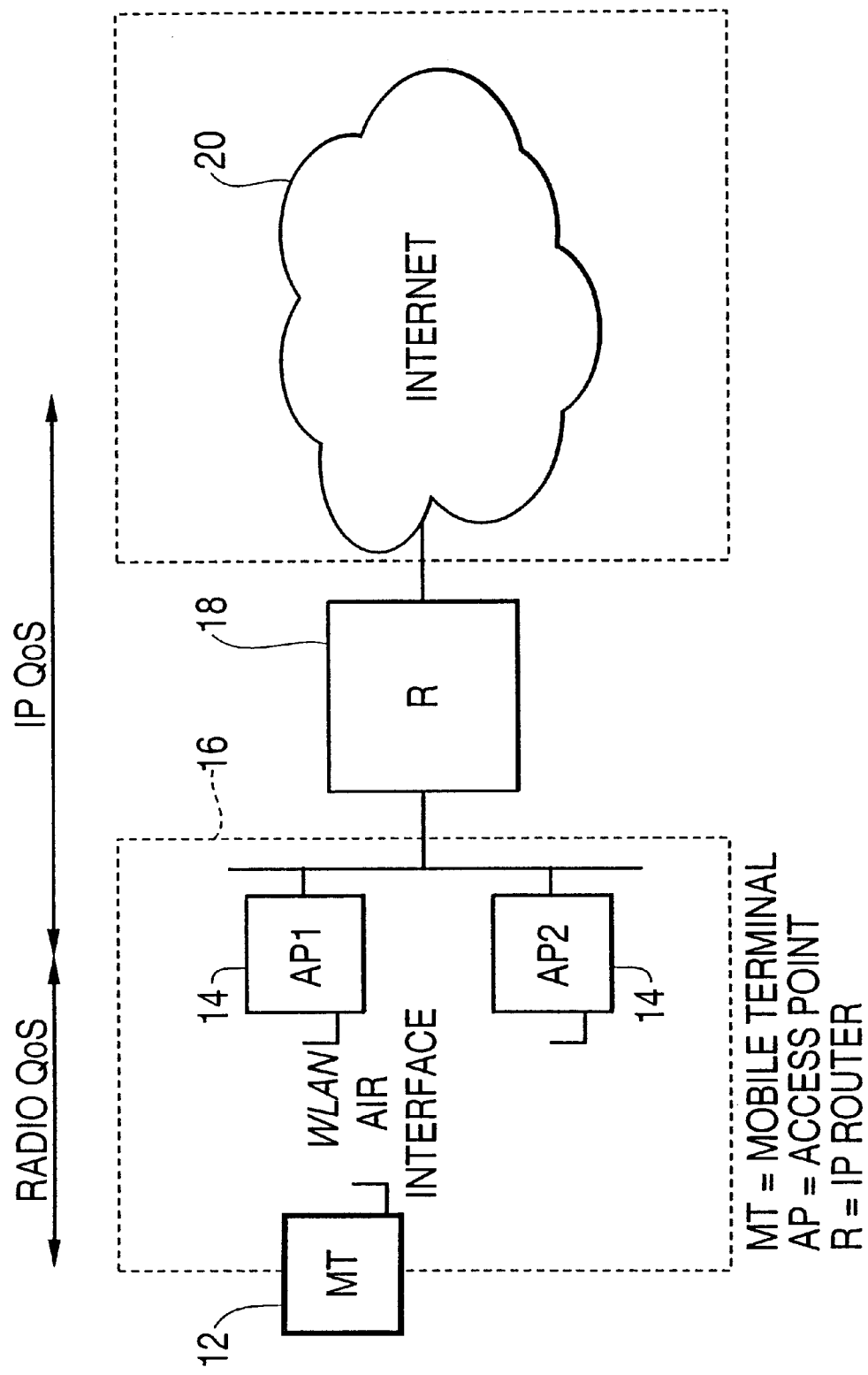
FIG. 2 is a block diagram of an exemplary QoS aware system with a WLAN connected to an IP network according to the present invention.

FIG. 2 is a block diagram of an exemplary QoS aware system with a WLAN connected to an IP network according to the present invention. A mobile terminal (MT) 12 is connected via a wireless link to an access point (AP1 or AP2) 14 and a WLAN 16. Although only one MT is shown, there may be a plurality of mobile terminals associated with each access point 14. In this exemplary system, a WLAN is connected via an IP router 18 to an Internet backbone 20. Information traffic may flow downstream, from the Internet to an access point and then to a mobile terminal, or upstream from a mobile terminal through an access point to the Internet. Information traffic may also flow from/to a mobile terminal to/from any device on the WLAN, or flow from/to the Internet to/from any device on the WLAN. Although, in this exemplary embodiment a WLAN is connected to an IP network, the WLAN may be connected to any type network or no network at all and still be within the spirit and scope of the present invention.

Figure 3:
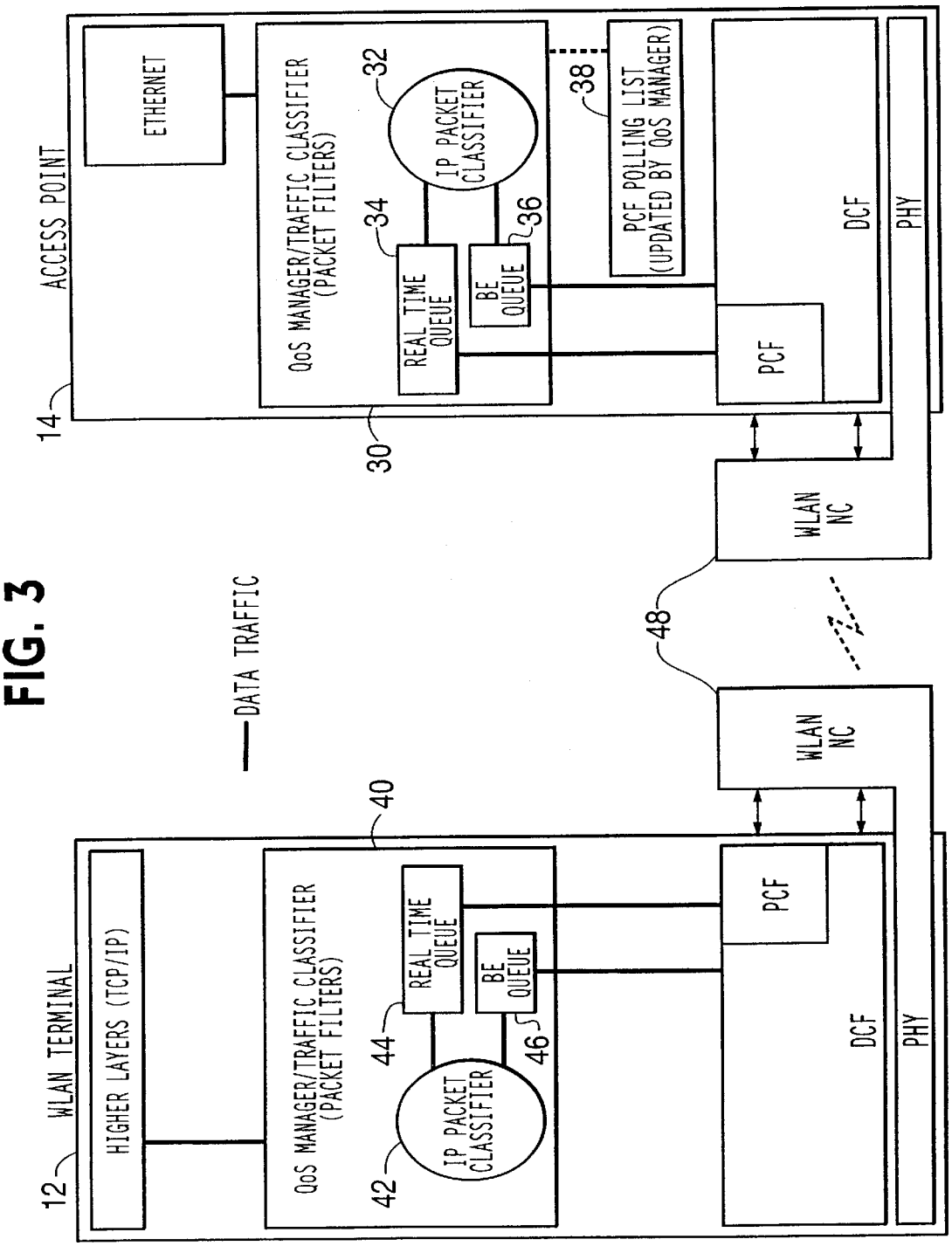
FIG. 3 is a block diagram of exemplary details of a mobile terminal and access point in an exemplary WLAN QoS system according to the present invention.

FIG. 3 is a block diagram of exemplary details of a mobile terminal and access point in an exemplary WLAN QoS system according to the present invention. Uplink data (data from MT to AP) and downlink data (data from AP to MT) may be divided into Best Effort (BE) data and Real Time (RT) data. A mechanism that classifies the IP packets on the basis of static traffic filters (TCP port numbers, IP addresses, etc.) or dynamic traffic filters (same as static but dynamically changeable) may exist which may be used to help differentiate BE data from RT data. The present invention integrates Open Systems Interconnections (OSI) layer 3 QoS information (i.e., the traffic filters) and OSI layer 2 transmit queue control (i.e., the PCF/DCF transmission alternation). In the 802.11 standard, the layer 2 QoS mechanism may be simply PCF utilization.

In FIG. 3, a QoS manager 30 residing in an Access Point (AP) 14 may include a traffic classifier function 32 that determines BE data from RT data. Each Mobile Terminal (MT) 12 and each AP 14 may have two different data queues, one for Real Time (RT) data 34 and one for Best Effort (BE) data 36. All real time traffic of a particular MT may be placed to a corresponding RT data queue 34. As mentioned previously, RT data is transmitted during a CFP, whereas BE data is transmitted during a CP. RT data queues 34 and BE data queues 36, in an AP platform 14 may be implemented on a per MT 14 basis (i.e., a BE and a RT data queue for each MT associated with the AP). If data packets should be handled as RT traffic, the corresponding MT identification may be placed onto an RT queue PCF polling list 38. Polling list 38 identifies mobile terminals that will be polled by the AP during the next CFP. Once polled, a mobile terminal that has real time data to transmit/receive would then do so.

QoS manager 30 may obtain QoS information from IP packet headers in data to/from AP 14, and/or from explicit reservations made by the mobile terminals. Based on the QoS information, the data packets may then be placed either to a BE queue 36 or RT queue 34, which are emptied during a CP or CFP, respectively. Similarly, each mobile terminal 12 may have a QoS manager 40 that includes a traffic classifier function 42, Real Time data queue 44, and Best Effort data queue 46. Identification and separation of the data into RT data and BE data may be achieved by any method and/or apparatus and still be within the spirit and scope of the present invention. Mobile terminal 12 and access point 14 may communicate at the physical layer via a WLAN network interface card (NIC) 48.

In methods and systems for weighted PCF polling lists according to the present invention, enhanced polling list handling allows versatility in the polling of WLAN terminals. Instead of terminals (e.g., mobile terminals) being polled once during each CFP (per 802.11 standard), a particular terminal may only be polled once per every two CFPs (may be in conflict with 802.11 standard which requires each pollable terminal to be polled once per CFP), or multiple times during a single CFP (compatible with 802.11 standard).

Generally, a terminal informs an AP of the terminal's PCF pollability (i.e., the terminal's desire to be polled because it may have a data transfer) in an Association Request message. The terminal then becomes a pollable terminal. Pollable terminals are polled during a CFP by an AP. A Re-association message, that changes the PCF pollability of the terminal (e.g., the terminal was pollable, but now desires to be non-pollable, or vice versa), may be sent by a terminal to an AP. Pollable terminals may be listed in a polling list. During the CFP, the AP polls each terminal that has been listed in the polling list for that AP. The 802.11 standard states that after each terminal listed in the polling list is polled once, any terminal may be polled again if the contention free period is still active. Terminals may be polled a number of times per CFP that the terminal is listed in the polling list.

A weighted polling list allows terminals with real-time data to be polled more than once per polling period. The polling of terminals may be determined by a weighting factor assigned to each terminal. For example, a weighting factor=1 assigned to a terminal may denote that this terminal is to be polled once during every CFP, whereas a weighting factor=3 assigned to a different terminal may denote that this second terminal may be polled 3 times during every CFP. The weighting factor may be any positive number between zero and X, where X=maximum length of the polling period/maximum packet size. The weighting factor for each terminal may be a specific value for a particular CFP. However, the weighting factor for one or more terminals may be modified between CFPs to have different values for the next CFP. A polling list of pollable terminals may be updated based on the weighting factor of each terminal. In order to assure the lowest possible delay and sufficient bandwidth for real-time connections, an AP may place terminals with active real-time connections on the polling list before any other terminals. The polling list may be constructed under control of a QoS Manager or other management entity. The polling list may be constructed on the basis of various information, e.g., current real-time "connections", QoS information, terminal profiles, etc.

FIG. 4 shows a block diagram of an example weighted polling list according to the present invention. In a conventional polling list, all mobile terminals are listed once, and are polled once in accordance with the 802.11 standard. In a weighted polling list according to the present invention, the number of times each mobile terminal may be polled is determined by an assigned weighting factor and, therefore, as shown in FIG. 4, a mobile terminal may be listed in the polling list more than once depending on the weighting factor of the mobile terminal. In FIG. 4, mobile terminal 1 (MT1) is listed once whereas mobile terminal 3 (MT3) is listed three times. Therefore, MT1 may be polled once, while MT3 may be polled three times during a specific CFP. For the next CFP, the mobile terminals may have changed their pollability, and/or the AP may have modified the weighting factors for one or more mobile terminals, therefore, causing modifications to the CFP polling list for the upcoming CFP.

The weighting factor determination and/or modification of the weighting factor may be based on information related to QoS. A QoS manager may obtain QoS related information from well known QoS mechanisms, e.g., Differentiated Services (a small bit-pattern in each packet is used to mark a packet to receive a particular forwarding treatment, or per-hop behavior, at each network node), Integrated Services (the transport of audio, video, real-time, and classical data traffic within a single network infrastructure), VoIP signaling, billing information, etc. Any other mechanisms for obtaining QoS related information are also within the spirit and scope of the present invention. Information not related to QoS may also be obtained and used in the determination of the weighting factors for each terminal. Therefore, any information or methods for determining weighting factors for terminals for polling of the terminals during a CFP are within the spirit and scope of the present invention. Determination of the weighting factors may be implementation or application specific. Call Admission Control (CAC) (which tracks granted resources and determine if additional resources may be allocated, e.g., to a terminal with a new VoIP connection) may be used to limit the total number of terminals in the polling list.

Separation of IP Voice/Video traffic from conventional IP Data traffic is a crucial operation in order to deliver reliable IP Voice traffic over a wireless LAN. This traffic differentiation and prioritization has to be implemented in layer 2 as well. PCF gives a tool for controlling the delivery of RT traffic and BE traffic in the same air interface. Thus, it is advantageous to implement QoS management using weighted polling lists.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed:

1. A method for weighted polling of terminals in a Wireless Local Area Network (WLAN) comprising:

obtaining Quality of Service (QoS) related information related to WLAN terminals;

assigning a weighted polling factor to each WLAN terminal based on the QoS information, each weighted polling factor denoting a number of times each said WLAN terminal is to be polled; and polling each WLAN terminal during a transmission period based on the weighted polling factor assigned to each WLAN terminal, the weighted polling factor assigned for each said WLAN terminal being changeable between each said transmission period.

2. The method according to claim 1, the QoS related information comprising at least one of billing information, an amount of real time traffic destined at least one of from and to at least one WLAN terminal, a user profile of at least one WLAN terminal, and an amount of bandwidth consumed by at least one WLAN terminal.

3. The method according to claim 1, wherein each WLAN terminal is polled by a Point Coordinator (PC).

4. The method according to claim 3, the Point Coordinator (PC) residing in an Access Point (AP), the Access Point providing wireless WLAN terminals access to the WLAN.

5. The method according to claim 1, wherein at least one WLAN terminal is pollable.

6. The method according to claim 1, wherein the transmission period is an IEEE 802.11 Contention Free Period (CFP).

7. The method according to claim 1, wherein the WLAN terminal is a mobile terminal.

8. The method according to claim 1, at least one WLAN terminal being polled at least once during the transmission period.

9. The method according to claim 1, at least one WLAN terminal being polled at least once during every other transmission period.

10. A method for transferring data based on weighted polling of terminals in a Wireless Local Area Network (WLAN) comprising:

dividing data to be transferred into best effort data and real time data;

storing the best effort data in a best effort queue;

storing the real time data in a real time queue;

obtaining information related to at least one WLAN terminal associated with some real time data;

assigning a weighted polling factor to each at least one WLAN terminal based on the information;

placing a terminal identification of each at least one WLAN terminal in a polling list at least once based on the weighted polling factor of each at least one WLAN terminal;

polling WLAN terminals whose terminal identification is in the polling list based on a number of times each WLAN terminal identification is listed in the polling list, each polled WLAN terminal transferring the associated real time data during a transmission period.

11. The method according to claim 10, wherein the information is Quality of Service (QoS) related information.

12. The method according to claim 11, the QoS related information comprising at least one of billing information, an amount of real time traffic destined at least one of from and to at least one WLAN terminal, a user profile of at least one WLAN terminal, and an amount of bandwidth consumed by at least one WLAN terminal.

13. The method according to claim 10, wherein each weighted polling factor denotes a number of times each WLAN terminal is to be polled.

14. The method according to claim 10, wherein the transmission period is an IEEE 802.11 Contention Free Period (CFP).

15. The method according to claim 12, wherein the WLAN terminal is a mobile terminal.

16. A Wireless Local Area Network (WLAN) Quality of Service (QoS) system that provides weighted polling of WLAN terminals comprising:
- a WLAN;
- at least one access point operatively connected to the WLAN, the access point including:
  - a real time data queue;
  - a best effort data queue;
  - a data packet classifier, the data packet classifier separating data into real time data and best effort data;
  - a data transfer manager, the data transfer manager storing the real time data in the real time data queue and the best effort data in the best effort data queue; and
  - a polling list;
- at least one WLAN terminal operatively connected to the at least one access point, the data transfer manager obtaining QoS related information related to the at least one WLAN terminal and assigning a weighted polling factor to each at least one WLAN terminal based on the QoS related information,
- wherein the data transfer manager places a terminal identification of each at least one WLAN terminal related to some real data in the polling list at least once based on the weighted polling factor of each at least one WLAN terminal, the data transfer manager polling WLAN terminals whose terminal identification is in the polling list based on a number of times each WLAN terminal identification is listed in the polling list, each polled WLAN terminal transferring its related real time data during a transmission period.

17. The system according to claim 16, wherein the transmission period is an IEEE 802.11 Contention Free Period (CFP).

18. The system according to claim 16, wherein the WLAN terminal is a mobile terminal.

19. The system according to claim 16, the QoS related information comprising at least one of billing information, an amount of real time traffic destined at least one of from and to at least one WLAN terminal, a user profile of at least one WLAN terminal, and an amount of bandwidth consumed by at least one WLAN terminal.

* * * * *